US009280904B2

(12) United States Patent
Bourret et al.

(10) Patent No.: US 9,280,904 B2
(45) Date of Patent: Mar. 8, 2016

(54) METHODS, SYSTEMS AND COMPUTER READABLE MEDIA FOR ARMING AIRCRAFT RUNWAY APPROACH GUIDANCE MODES

(71) Applicant: AIRBUS OPERATIONS (SAS), Toulouse (FR)

(72) Inventors: Thierry Bourret, Toulouse (FR); Pascale Louise, Toulouse (FR); Claire Ollagnon, Montpellier (FR); Nicolas Chauveau, Montpellier (FR); Sebastien Giuliano, Toulouse (FR); Sebastien Drieux, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 13/835,201

(22) Filed: Mar. 15, 2013

(65) Prior Publication Data

US 2014/0277857 A1 Sep. 18, 2014

(51) Int. Cl.
*G06F 7/70* (2006.01)
*G08G 5/02* (2006.01)
*G08G 5/00* (2006.01)

(52) U.S. Cl.
CPC .............. *G08G 5/025* (2013.01); *G08G 5/0013* (2013.01)

(58) Field of Classification Search
USPC .............................................. 701/14–17, 120
See application file for complete search history.

(56) References Cited

U.S. PATENT DOCUMENTS

| | | | |
|---|---|---|---|
| 812,174 | A | 2/1906 | Grundal |
| 4,538,229 | A | 8/1985 | Baltzer et al. |
| 4,807,158 | A | 2/1989 | Blanton et al. |
| 5,648,755 | A | 7/1997 | Yagihashi |
| 5,842,142 | A | 11/1998 | Murray et al. |
| 5,936,552 | A | 8/1999 | Wichgers et al. |
| 5,978,715 | A | 11/1999 | Briffe et al. |
| 6,072,473 | A | 6/2000 | Muller et al. |
| 6,085,145 | A | 7/2000 | Taka et al. |
| 6,181,987 | B1 | 1/2001 | Deker et al. |
| 6,236,913 | B1 | 5/2001 | Bomans et al. |
| 6,353,734 | B1 | 3/2002 | Wright et al. |

(Continued)

FOREIGN PATENT DOCUMENTS

| | | |
|---|---|---|
| EP | 0562929 | 9/1993 |
| EP | 2063227 | 5/2009 |
| FR | 2 694 104 | 1/1994 |

OTHER PUBLICATIONS

French Search Report for FR 1160884 dated Jul. 5, 2012.
French Search Report for FR 1350247 dated Nov. 22, 2013.
Non-Final Office Action for U.S. Appl. No. 13/861,052 dated Feb. 14, 2014.
Final Office Action for U.S. Appl. No. 13/861,052 dated Jun. 16, 2014.

(Continued)

*Primary Examiner* — Hussein A. Elchanti
(74) *Attorney, Agent, or Firm* — Jenkins, Wilson, Taylor & Hunt, P.A.

(57) ABSTRACT

Methods, systems, and computer readable media are disclosed for direct arming aircraft runway approach guidance modes, for example and without limitation, for aircraft operational. In some aspects, a method for directly arming a runway approach guidance mode of an aircraft includes displaying on a display unit an airport, selecting the airport and selecting an active runway for final approach, displaying an path toward the selected final approach runway, selecting the final approach runway, displaying on the display unit at least one symbol associated with at least one runway approach guidance mode, and arming at least one of the at least one runway approach guidance mode.

23 Claims, 9 Drawing Sheets

(56) References Cited

U.S. PATENT DOCUMENTS 6,573,841 B2 6/2003 Price
6,832,138 B1 12/2004 Straub et al.
6,910,657 B2 6/2005 Schneider
D517,435 S 3/2006 Yamada
7,307,549 B2 12/2007 Firra
D559,260 S 1/2008 Noviello
D563,977 S 3/2008 Carl et al.
7,343,229 B1 * 3/2008 Wilson .......................... 701/15
D579,458 S 10/2008 Nash et al.
7,577,501 B2 8/2009 Tafs et al.
D608,793 S 1/2010 Canu-Chiesa
7,693,621 B1 * 4/2010 Chamas .......................... 701/16
7,702,427 B1 4/2010 Sridhar et al.
D615,100 S 5/2010 Canu-Chiesa
7,751,948 B2 7/2010 Boorman et al.
7,765,061 B1 7/2010 Barber et al.
7,830,275 B2 11/2010 Hiraoka
D634,332 S 3/2011 Spek
7,996,121 B2 8/2011 Ferro et al.
D644,651 S 9/2011 Spek
D644,652 S 9/2011 Spek
D644,653 S 9/2011 Spek
D646,689 S 10/2011 Ulliot
8,078,343 B2 12/2011 Ferreira et al.
8,108,087 B2 1/2012 Stone et al.
8,217,807 B1 7/2012 Carrico
8,234,068 B1 7/2012 Young et al.
8,290,642 B2 10/2012 Hanson
8,310,446 B1 11/2012 Owen et al.
8,311,686 B2 11/2012 Herkes et al.
8,380,366 B1 2/2013 Schulte et al.
8,493,240 B1 7/2013 Carrico
8,565,944 B1 10/2013 Gershzohn
8,587,617 B2 11/2013 Hoff et al.
8,829,401 B1 9/2014 Lutke et al.
D726,758 S 4/2015 Bourret
9,052,198 B2 6/2015 Louise-Babando et al.
9,174,725 B2 11/2015 Porez et al.
2003/0025719 A1 2/2003 Palmer et al.
2003/0060940 A1 3/2003 Humbard et al.
2003/0112503 A1 6/2003 Lantin
2004/0006412 A1 * 1/2004 Doose et al. .................... 701/10
2004/0044446 A1 * 3/2004 Staggs .......................... 701/16
2004/0056895 A1 3/2004 Hedrick
2004/0260458 A1 12/2004 Park et al.
2005/0065671 A1 3/2005 Horvath et al.
2005/0156777 A1 7/2005 King et al.
2005/0222766 A1 10/2005 Burch et al.
2005/0261808 A1 11/2005 Artini et al.
2005/0273220 A1 12/2005 Humbard et al.
2006/0132460 A1 6/2006 Kolmykov-Zotov et al.
2006/0164261 A1 7/2006 Stiffler
2007/0088492 A1 4/2007 Bitar et al.
2007/0129855 A1 6/2007 Colmeau
2007/0182590 A1 8/2007 Younkin
2007/0288129 A1 12/2007 Komer et al.
2008/0046134 A1 2/2008 Bruce et al.
2008/0243318 A1 10/2008 Ferro et al.
2008/0249675 A1 * 10/2008 Goodman et al. .............. 701/16
2009/0070123 A1 3/2009 Wise et al.
2009/0105890 A1 4/2009 Jones et al.
2009/0118997 A1 * 5/2009 Truitt .......................... 701/120
2009/0171560 A1 7/2009 McFerran
2009/0281684 A1 11/2009 Spek
2010/0010958 A1 1/2010 Perrow et al.
2010/0042316 A1 2/2010 Caillaud
2010/0156674 A1 6/2010 Dwyer et al.
2010/0161157 A1 6/2010 Fabien et al.
2010/0194601 A1 8/2010 Servantie et al.
2010/0305786 A1 12/2010 Boorman
2010/0324807 A1 * 12/2010 Doose et al. .................. 701/120
2011/0001636 A1 1/2011 Hedrick
2011/0029919 A1 2/2011 Woltkamp
2011/0118908 A1 5/2011 Boorman et al.
2011/0184595 A1 7/2011 Albert
2011/0196599 A1 * 8/2011 Feyereisen et al. ........... 701/120
2011/0199239 A1 8/2011 Lutz
2011/0208374 A1 8/2011 Jayathirtha et al.
2011/0213514 A1 9/2011 Baxter
2011/0246015 A1 10/2011 Cummings et al.
2011/0264312 A1 10/2011 Spinelli et al.
2011/0313645 A1 * 12/2011 Shukla .......................... 701/120
2012/0010765 A1 1/2012 Wilson
2012/0105318 A1 * 5/2012 Nutaro et al. ................. 345/157
2012/0116614 A1 5/2012 Torres et al.
2012/0209458 A1 * 8/2012 Sampath ......................... 701/14
2012/0215433 A1 8/2012 Subbu et al.
2012/0253564 A1 10/2012 Noll et al.
2013/0046462 A1 * 2/2013 Feyereisen et al. ........... 701/457
2013/0090841 A1 * 4/2013 Barraci et al. ................ 701/120
2013/0100042 A1 4/2013 Kincaid
2013/0135202 A1 5/2013 Louise-Babando
2013/0179011 A1 7/2013 Colby et al.
2013/0204524 A1 8/2013 Fryer et al.
2013/0211635 A1 8/2013 Bourret
2013/0215023 A1 8/2013 Bourret
2013/0271300 A1 * 10/2013 Pepitone et al. .............. 340/972
2013/0278444 A1 * 10/2013 Venkataswamy et al. .... 340/972
2014/0081569 A1 3/2014 Agrawal et al.
2014/0200748 A1 7/2014 Porez
2014/0309821 A1 10/2014 Poux et al.

OTHER PUBLICATIONS

Restriction Requirement for U.S. Appl. No. 13/835,506 dated Mar. 27, 2014.

Restriction Requirement for U.S. Appl. No. 29/449,551 dated Apr. 9, 2014.

Non-Final Office Action for U.S. Appl. No. 13/687,729 dated Jul. 18, 2014.

Notice of Allowance for U.S. Appl. No. 29/449,551 dated Jul. 18, 2014.

Non-Final Office Action for U.S. Appl. No. 13/835,506 dated Jun. 26, 2014.

Interview Summary for U.S. Appl. No. 13/861,052 dated Aug. 5, 2014.

Non-Final Office Action for U.S. Appl. No. 13/834,401 dated Sep. 2, 2014.

Non-Final Office Action for U.S. Appl. No. 13/861,052 dated Sep. 26, 2014.

Notice of Allowance for U.S. Appl. No. 29/449,551dated Oct. 22, 2014.

Interview Summary for U.S. Appl. No. 13/687,729 dated Oct. 27, 2014.

Notice of Publication for U.S. Appl. No. 13/861,052 dated Oct. 16, 2014.

Final Office Action for U.S. Appl. No. 13/835,506 dated Nov. 14, 2014.

Interview Summary for U.S. Appl. No. 13/834,401 dated Nov. 17, 2014.

Final Office Action for U.S. Appl. No. 13/834,401dated Jan. 13, 2015.

Extended European Search Report for Application No. EP 14 16 4240.5 dated Nov. 14, 2014.

Final Office Action for U.S. Appl. No. 13/687,729 dated Jan. 26, 2015.

Advisory Action for U.S. Appl. No. 13/835,506 dated Jan. 30, 2015.

Notice of Allowance for U.S. Appl. No. 13/687,729 dated Apr. 15, 2015.

Non-Final Office Action for U.S. Appl. No. 13/905,914 dated Mar. 26, 2015.

Final Office Action for U.S. Appl. No. 13/861,052 dated Jun. 11, 2015.

Notice of Allowance for U.S. Appl. No. 13/905,914 dated Jul. 1, 2015.

Non-Final Office Action for U.S. Appl. No. 13/835,506 dated Jul. 28, 2015.

Non-Final Office Action for U.S. Appl. No. 13/861,052 dated Oct. 13, 2015.

* cited by examiner

METHODS, SYSTEMS AND COMPUTER READABLE MEDIA FOR ARMING AIRCRAFT RUNWAY APPROACH GUIDANCE MODES

TECHNICAL FIELD

The subject matter described herein relates generally to landing systems for aircraft operation. More particularly, the subject matter disclosed herein relates methods, systems, and computer readable media for directly arming runway approach guidance modes of an aircraft.

BACKGROUND

The general procedure of a landing approach for an aircraft involves a list of procedures involving various control features located across a flight deck instrument display system onboard the aircraft. The flight deck instrument display system can include aircraft avionic instruments such as the navigation display, the radio panel, the flight control unit, and the multi-function display. Currently, an aircraft operator is required to possess specialized training and preparation in order to know where to locate the various controls for selecting an active runway and arm the various runway approach guidance modes. For example, an aircraft operator has to locate the ATIS frequency on the approach charts, to set the ATIS frequency on the Radio panel, to select an active runway on a dedicated flight management system page, and arm approach modes on a flight control unit. Therefore, it is desirable to reduce the time and energy an aircraft operator has to spend to memorize and locate the various controls for a landing procedure. Particularly, it would be beneficial to provide techniques for an aircraft operator to perform a landing procedure without have to locate the various controls to arm the runway approach guidance modes.

Accordingly, there is a need for systems, methods, and computer readable media for directly arming of runway approach guidance modes of an aircraft during landing.

SUMMARY

In some aspects, the subject matter described herein can comprise a method for direct arming of runway approach guidance modes of an aircraft. The method can comprise selecting an airport from a flight management system database, selecting an active runway for final approach from a list of available runways, displaying on a display unit the selected final approach runway and an approach path associated with the final approach runway, and upon the aircraft operator's request, arming the final approach path, and displaying on the display unit an interactor associated with the active runway. The method can also comprise displaying on the display unit at least one symbol associated with at least one runway approach guidance mode, and arming at least one of the at least one runway approach guidance mode.

In another aspect, the subject matter described herein can comprise a system for direct arming of runway approach guidance modes of an aircraft. The system can comprise a display unit, a memory, and a processor. The system further can comprise an aircraft runway approach mode engagement module configured to select an airport from a flight management system database, select an active runway from a list of available runways, display on a display unit an active runway and an approach path associated with the selected runway, upon the aircraft operator's request, arm the final approach path, display an interactor associated with the active runway on the display unit, display on a display unit at least one symbol associated with at least one runway approach guidance mode, and arm at least one runway approach guidance mode.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein can comprise non-transitory computer readable media such as, for example and without limitation, disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
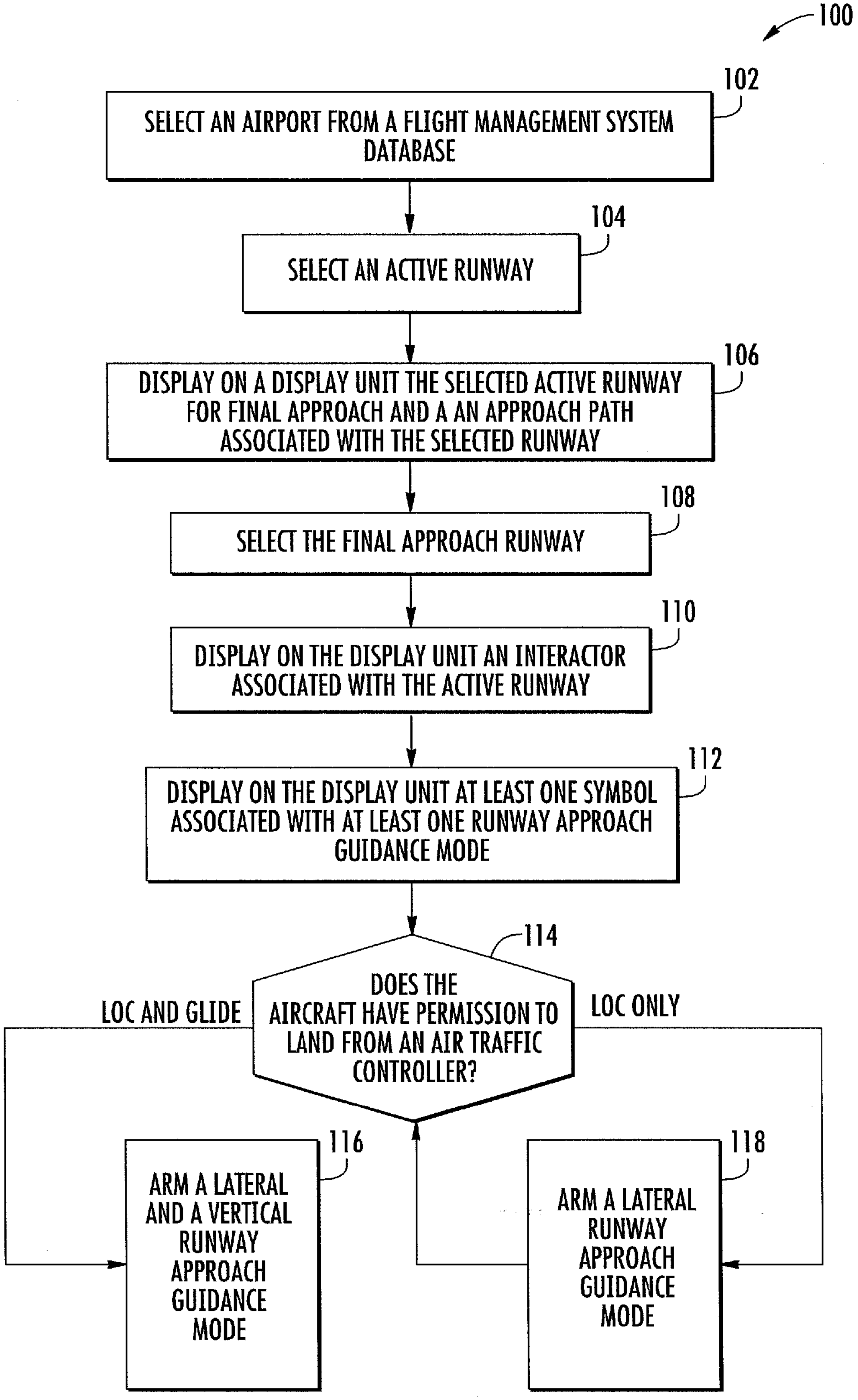
FIG. 1 is a flow chart illustrating an exemplary method for directly arming runway approach guidance modes of an aircraft in accordance with aspects of the subject matter described herein.

In accordance with the description herein and exemplary, associated drawings, novel methods, systems, and computer readable media are disclosed for direct selection of a runway for final approach and direct arming of runway approach guidance modes of an aircraft. Such methods, systems and computer readable media are particularly suitable for use, for example and without limitation, for aircraft operational use during a landing procedure.

During an aircraft's descent to an airport, various runways can be used, using various navigations means, and various approach guidance modes can be armed to guide the aircraft down to the ground. The general procedure for selecting and arming a landing runway approach can begin with the aircraft operator viewing a list of airports on a flight management system database. The list of airports can be displayed on a navigation display unit located within the flight deck instrument display system. Once the aircraft operator selects an airport for landing, the onboard avionics can recover from the database the radio frequency associated with the selected airport, and set an onboard radio to this frequency to acquire data from the airport's Automatic Terminal Information System (ATIS). Alternatively, the ATIS data can be transmitted to the aircraft digitally (D-ATIS) via a data link.

From the ATIS information, active runways associated with the selected airport and pertinent information such as current meteorological characteristics, visibility limitations or instrumentation restriction on the use of runways can be obtained. From this information an active runway for final approach can be selected either manually by the aircraft operator, or automatically based on additional system variables such as requested landing distance, onboard available navigation means. A navigational guidance method for the final approach can be selected based on the availability of on the ground guidance means such as an ILS or GLS system, and the availability of onboard guidance instruments, such as an ILS receiver or a GPS receiver. This selection can be performed either digitally by the onboard avionics and then confirmed by an aircraft operator, or selected manually by the aircraft operator from a list of possible choices. Once an active runway has been selected for the final approach, the flight plan can be updated accordingly in the aircraft's onboard avionics to connect it to an existing initial approach path. The updated flight plan can be depicted on a display unit, but may not be followed exactly by the aircraft due to possible air traffic constraints. The display unit can comprise a vertical display (VD), a navigation display (ND), and a primary flight display (PFD). The selected final approach runway and the final approach path can be displayed, including a set of vertical and lateral flight paths for the final approach. Correspondingly, the onboard navigation instruments can be configured by the flight management system to receive a set of signals needed to perform the final approach. The set of signals can be generated by navigational systems such as an instrument landing system (ILS), a global positioning landing system (GLS), or a VHF omnidirectional radio range (VOR) system.

With the onboard avionics navigation instruments set to receive the appropriate radio signal, the aircraft operator can then arm appropriate runway final approach guidance modes. In one aspect, this approach mode may be limited to a lateral runway approach guidance mode only, thereby using only the lateral axis, known as the Localizer mode. In another aspect, both the lateral and vertical, also known as the glide slope, runway approach guidance modes can be armed, therefore utilizing both the localizer and glide slope axis of the ILS system. In addition, these runway approach guidance modes can be disarmed by engagement of other auto-flight modes. Pseudo-localizer and pseudo-glide mode can also be armed respectively as selected navigation modes differing from ILS modes.

The arming of the various runway approach guidance modes can be performed on a dedicated set of controls located in the flight deck instrument display system, and not necessarily a part of the display unit where the updated flight plan is shown. As described in greater detail below, and in accordance with embodiments of the subject matter described herein, directly arming the various runway approach guidance modes can be performed on a display unit. Wherein flight information such as a visual display of airport selection data, flight path data, vertical and horizontal flight data, and runway approach guidance mode controls can all be shown within the same display unit.

Figure 3:
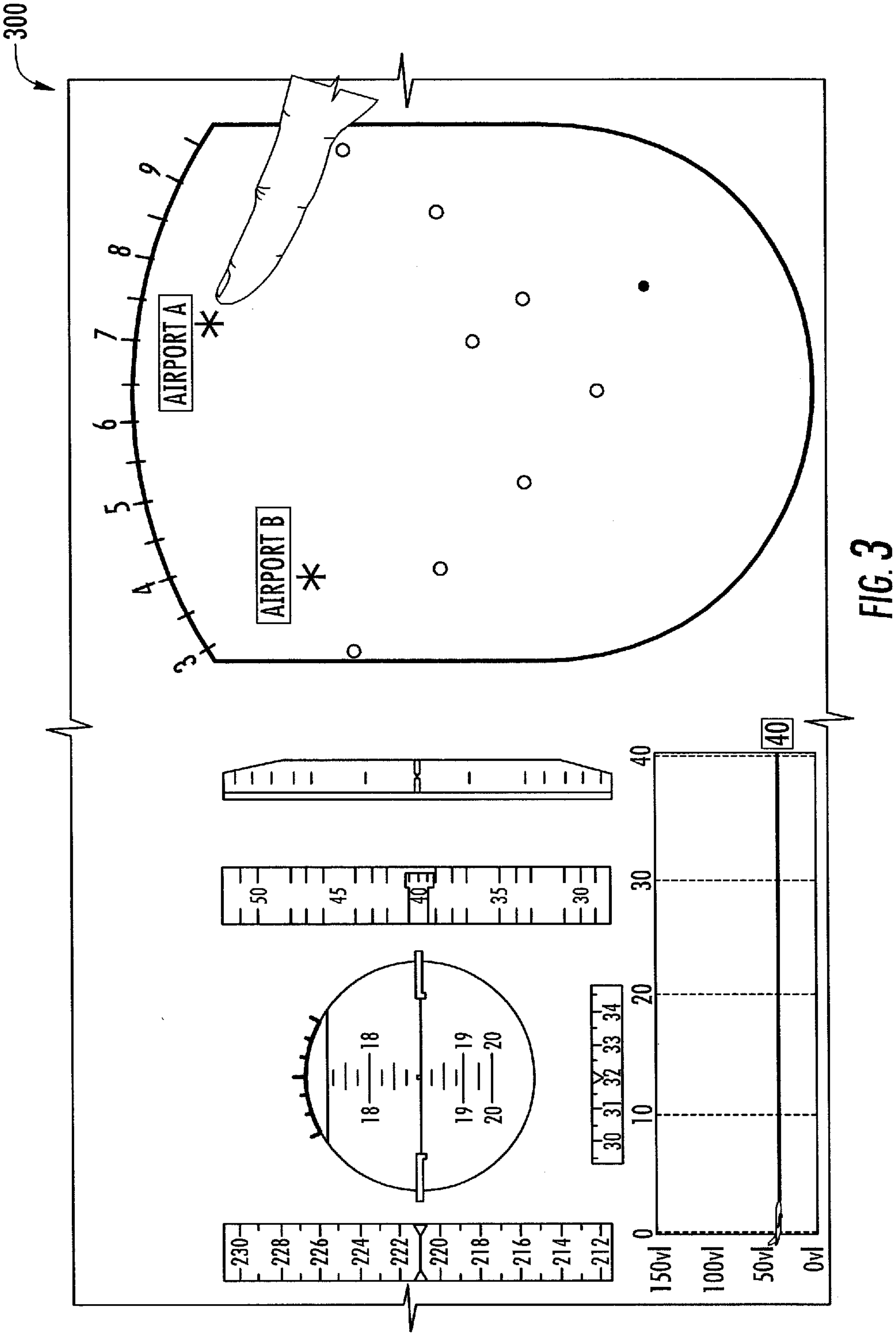
FIG. 3 is an exemplary illustration of the aircraft operator selecting an airport from multiple available airports in accordance with aspects of the subject matter described herein.

FIG. 1 is a flow chart illustrating an exemplary method generally designated 100 for directly arming runway approach guidance modes of an aircraft in accordance with embodiments of the subject matter described herein. Referring to FIG. 1, at step 102, as an optional step, an airport can be selected from a flight management system database. For example, referring to FIG. 3, multiple available airports can be displayed on the aircraft's onboard avionics. An aircraft operator can view the airport data on a display unit located within the flight deck instrument display system. In some aspects, the display unit located within the flight deck instrument display system can be an interactive touch screen, and the aircraft operator can select an airport by physically touching the airport data shown on the interactive touch screen. It is envisioned also that a list or even a particular airport can be determined and/or generated automatically based upon any suitable information.

Figure 4:
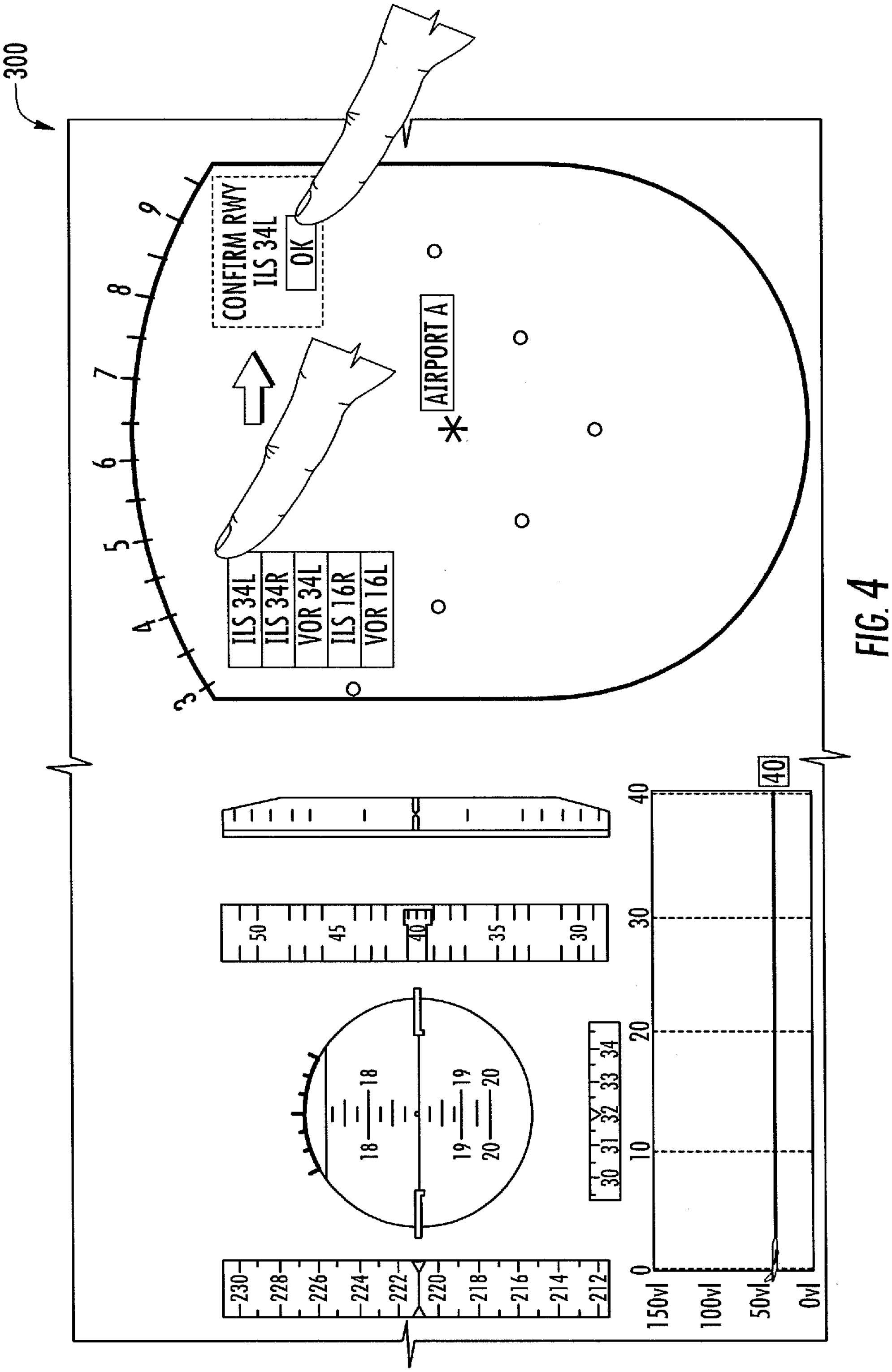
FIG. 4 is an exemplary illustration of the aircraft operator selecting a runway for final approach in accordance with aspects of the subject matter described herein.

Now referring back to FIG. 1, at step 104 a list of active runways associated with the selected airport can be displayed on a display unit located within the flight deck instrument display system. For example, once an airport has been selected on the navigation display, a radio onboard the aircraft can automatically tune to an airport broadcasting station to receive active runway information. In some aspects, the active runway information can be received by the aircraft through a digital uplink or retrieved from an onboard database. In another aspect, the active runway information can be transmitted to the aircraft operator by direct voice communication, and the aircraft operator can then select an active runway for final approach from a selection list of all possible runways onboard the aircraft. The active runway and an associated approach path can then be viewed on the display unit. For example, referring to FIG. 4, an aircraft operator can view the active runway list on the display unit, and in some aspects, the display unit can be an interactive touch screen, and the aircraft operator can select an active runway for final approach by physically touching the runway's sign shown on the interactive touch screen. The selection can then be confirmed by the aircraft operator on the same interactive touch screen. Alternatively, in another aspect, an active runway for final approach can be automatically selected by the onboard avionics, and the aircraft operator can then only confirm the selection on the display screen. Furthermore, the list of available active runways can be generated according to variables such as current meteorological characteristics, visibility limitations, instrumentation restrictions, and the amount of air traffic during the time of the landing. For example, Chicago's O'Hare International Airport can have several runways active for landing at one time and accordingly can have at least twice as many possible approaches paths. All possible active runways and approach paths can be determined based upon system variables such as runway availability, the wind conditions, runway length in accordance with predicted needed landing distance, available navigation methods (ground and onboard) at the time the active runway information is requested. In some aspects, only one active runway may be available for final approach, and the onboard avionics can select that one runway automatically and present it to the aircraft operator for confirmation. In another aspect, several active runways may be available for the final approach, and the onboard avionics can rank all the available active runways according to a combination of one or more runway variables such as lowest landing minimas or decision heights, highest landing distance margin, and/or shortest taxi time to gate.

Furthermore, in another aspect, selection of the active runway for final approach can be performed by clicking on the airport on the ND using a pointer device. The pointer device can be an interactive device such as a touch pad, a track ball, or a mouse. In yet another aspect, an eye tracker system can be utilized to select the airport. For example, an eye tracking system can be installed on the cockpit panel or integrated inside glasses worn by the pilot. In addition, the eye tracking system can be configured to detect the aircraft operator's eye movements and can be calibrated such that the operator can look at a general zone around the active runway to have it selected. For example, the aircraft operator can look at the airport for a predetermined amount of time (e.g. 1 second) to signal the eye tracker system to have the airport selected. Referring back to FIG. 1, at step 106, the selected final approach runway and an approach path associated with the final approach runway can be displayed on a display unit. For the display unit can comprise a navigation display of the aircraft, and the selected final approach runways can be shown as solid rectangular blocks on the navigation display. In addition, the approach path can comprise a line of semi-transparent rectangular blocks moving in a wave like motion towards the final approach runway.

In another aspect, the display unit can comprise a vertical display and a navigation display, and the approach path can comprise a vertical axis and a lateral axis which can also be part of an instrument landing system (ILS or GLS or any equivalent) associated with the final approach runway. For example, the approach path on the navigation display can comprise a lateral axis of the ILS axis system, providing a lateral guidance to the aircraft known as the localizer. For example, the lateral guidance can be provided by an antenna array consisting of pairs of directional antennas. These antenna pairs can transmit two signals to one of the ILS horizontal channels between 108 and 112 Hz, modulated to different frequencies, for example, at 90 and 150 Hz respectively. These modulated signals can be highly directional, one modulated beam aimed slightly left of runway centerline and the other slightly right of runway centerline. A receiver on the aircraft can measure the difference in the modulation between the two received signals and indicates to the aircraft operator the deviation from the centerline based on the predominance of one of the two modulated signals. The aircraft operator or the onboard avionics can then make corrections until the localizer signal becomes zero, meaning the aircraft approach path is coincident with runway centerline. Similarly, the approach path on the vertical display can comprise a vertical axis of the ILS axis system, providing a vertical guidance to the aircraft. For example, the vertical guidance can be provided by an antenna array that can for example comprise pairs of directional antennas. These antenna pairs can transmit two signals on one of the ILS vertical channels (e.g., between 329 and 335 Hz), modulated to different frequencies, for example, at 90 and 150 Hz respectively. These modulated signals can be highly directional, one modulated beam aimed slightly above runway vertical centerline, also known as glide slope, and the other slightly below glide slope. A vertical axis receiver on the aircraft can measure the difference in the modulation between the two received signals and indicate to the aircraft operator the deviation from the glide slope based on the predominance of one of the two modulated signals. The aircraft operator or the onboard avionics can then make corrections until the glide signal becomes zero, meaning the aircraft approach path is coincident with the runway glide slope. For runways that are not equipped to accommodate an ILS axis system, a vertical axis can be calculated by the aircraft's onboard avionics and displayed on the vertical display. Similarly, a lateral axis for runway approach can be calculated from data saved in the database onboard and displayed on the navigation display. Similarly, in yet another aspect, a global positioning landing system (GLS) can be utilized to provide runway approach guidance. For example, the aircraft's deviation from the runway approach path can be computed based on the aircraft's GPS position (eventually corrected by local or regional ground station) using barometric altitude, and the aircraft's final approach axis can be provided either by onboard database or by onboard navigation instruments based on signals from systems on the ground.

In yet another aspect, the display unit can comprise a vertical display and a navigation display, and the approach path can comprise a vertical axis and a lateral axis determined from runways data saved in a database onboard the aircraft or based on deviation determined by the onboard navigation instruments.

At step 108, the final approach runway can be selected. For example, after the final approach runway and the approach path are displayed on the display unit, the aircraft operator can select the final approach runway on the display unit. Once selected, the final approach runway and the approach path can appear highlighted. For example, once the aircraft operator selects the final approach runway, the runway and the approach path can appear blue in color.

In some aspects, the display unit can comprise a navigation display (ND) of the aircraft and can comprise an interactive touch screen. An aircraft operator can select the final approach runway by touching either the runway or the approach path on the interactive touch screen. In another aspect, selection of the final approach runway can be performed by clicking on the runway on the ND using a pointer device. The pointer device can be an interactive device such as a touch pad, a track ball, or a mouse. In yet another aspect, an eye tracker system can be utilized to select the final approach runway. For example, an eye tracking system can be installed on the cockpit panel or integrated inside glasses worn by the pilot. Furthermore, the eye tracking system can be configured to detect the aircraft operator's eye movements and can be calibrated such that the operator can look at a general zone around the final approach runway to have it selected. For example, the aircraft operator can look at the final approach runway for a predetermined amount of time (e.g. 1 second) to signal the eye tracker system to have the runway selected.

At step 110, an interactor associated with the final approach runway can be displayed on the display unit. For example, once the final approach runway has been selected, an interactor associated with the final approach runway can be displayed on top of the approach path. In one aspect, the interactor can be circular in shape with a pointed edge pointing towards the final approach runway.

At step 112, at least one symbol associated with at least one runway approach guidance mode can be displayed on the display unit. For example, selecting the interactor can show on the display unit a first symbol associated with a lateral runway approach guidance mode and a second symbol associated with a vertical and lateral guidance mode. For example, the display unit can comprise a navigation display (ND), and a symbol 'ARM LOC' can be displayed on the ND associated with the lateral runway approach guidance mode. Similarly, a symbol 'ARM APPR' can be displayed on the ND associated with both the vertical and lateral runway approach guidance modes. In some aspects, the ND can be an interactive touch screen, and selecting the interactor can be performed by the aircraft operator physically touching the interactor on the interactive touch screen. In another aspect, the interactor can be selected by the aircraft operator via interactions such as clicking on the interactor using a pointer device such as a touch pad, a track ball, or a mouse.

At step 114, an air traffic controller (ATC) can grant or deny the aircraft the permission to capture Localizer axis and/or glide slope. For example, the decision of when to let a particular aircraft to use a particular runway for landing can depend on the air traffic condition around that airport.

In some aspects, air traffic around the airport may be light. The ATC can give permission to the aircraft to land on the final approach runway. The aircraft operator can proceed to step 116 of FIG. 1 and arm both the lateral and vertical runway approach guidance modes of the aircraft. The flight path can then be changed accordingly on both the vertical display and the navigation display. For example, the new flight path can align the aircraft to the centerline of the final approach runway with a vertical trajectory aimed to land the aircraft on the final approach runway.

In another aspect, air traffic around the airport may be congested. The ATC can direct the aircraft to fly around the airport keeping a constant altitude and to align the aircraft's heading to the final approach runway's ILS localizer beam axis only. The aircraft operator can choose to proceed to step 118 of FIG. 1 and arm only the lateral runway approach guidance mode of the aircraft. The ATC can provide clearance later to capture the glide slope to proceed to step 116.

In one aspect, the ND can be an interactive touch screen. Arming the runway approach guidance modes can be accomplished via the aircraft operator touching the interactor with his finger, on the interactive touch screen, and slide it across the symbol associated with the runway guidance mode that is to be armed. For example, at step 116, to arm the lateral and vertical runway approach guidance modes, the aircraft operator can slide the interactor across the two symbols representing the guidance modes on the interactive touch screen (e.g., ARM LOC, ARM APPR, etc.). Similarly, at step 118, to arm only the lateral runway approach guidance mode, the aircraft operator can slide the interactor across only the lateral runway approach guidance mode symbol (e.g., ARM LOC, etc.).

In another aspect, a symbol 'ARM GLIDE' can be displayed on the display unit and associated with the vertical runway approach guidance mode. The aircraft operator can arm the vertical runway approach guidance mode by sliding the interactor across the vertical runway approach guidance mode symbol (e.g., ARM GLIDE, etc.).

Figure 2:
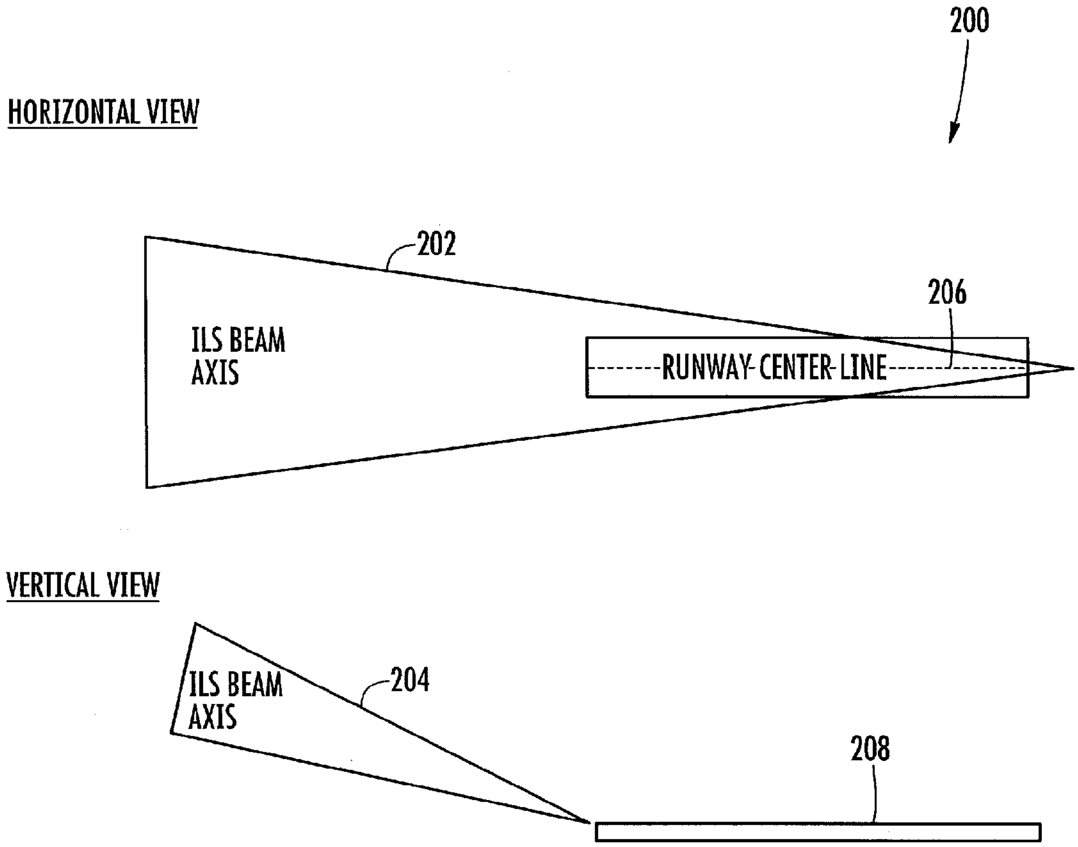
FIG. 2 is an exemplary illustration of an instrument landing system (ILS) associated with an active runway in accordance with aspects of the subject matter described herein.

FIG. 2 depicts an exemplary illustration of an instrument landing system (ILS) generally designated 200 associated with an active runway in accordance with embodiments of the subject matter described herein. As shown in FIG. 2, the ILS can comprise two independent subsystems, one providing lateral guidance in the form of a localizer 202, and the other providing vertical guidance in the form of a glide slope indicator 204. In one aspect, the localizer 202 can provide to the aircraft runway centerline 206 guidance support. For example, runway centerline 206 guidance can be provided by an antenna array consisting of pairs of directional antennas. These antenna pairs can transmit two signals on one of the ILS horizontal channels (e.g., between 108 and 112 Hz), modulated to different frequencies, for example, at 90 and 150 Hz respectively. These modulated signals can be highly directional, one modulated beam aimed slightly left of runway centerline 206 and the other slightly right of runway center line 206. A localizer receiver on the aircraft can measure the difference in the modulation between the two received signals and indicates to the aircraft operator the deviation from the runway centerline 206 based on a predominance of one of the two modulated signals. The aircraft operator 400 is then able to correct until the difference is zero, making the aircraft approach path in coincidence with the runway centerline 206. Furthermore, the glide slope indicator 204 can provide to the aircraft vertical guidance support. For example, the vertical guidance support can be provided by an antenna array consisting of pairs of directional antennas. These antenna pairs can transmit two signals on one of the ILS vertical channels (e.g., between 329 and 335 Hz), modulated to different frequencies, for example, at 90 and 150 Hz respectively. These modulated signals can be highly directional, as one modulated beam can aim slightly above runway vertical runway glide slope, and the other slightly below runway glide slope. For example, the runway glide slope can be determined to be 3 degrees above runway ground level 208. Furthermore, a glide slope receiver on the aircraft can measure the difference in the modulation between the two received signals and indicates to the aircraft operator a deviation from the glide slope based on the predominance of one of the two modulated signals. The aircraft operator can then make corrections in the aircraft's trajectory until the difference is zero, making the aircraft's approach in coincidence with the runway glide slope.

Figure 5:
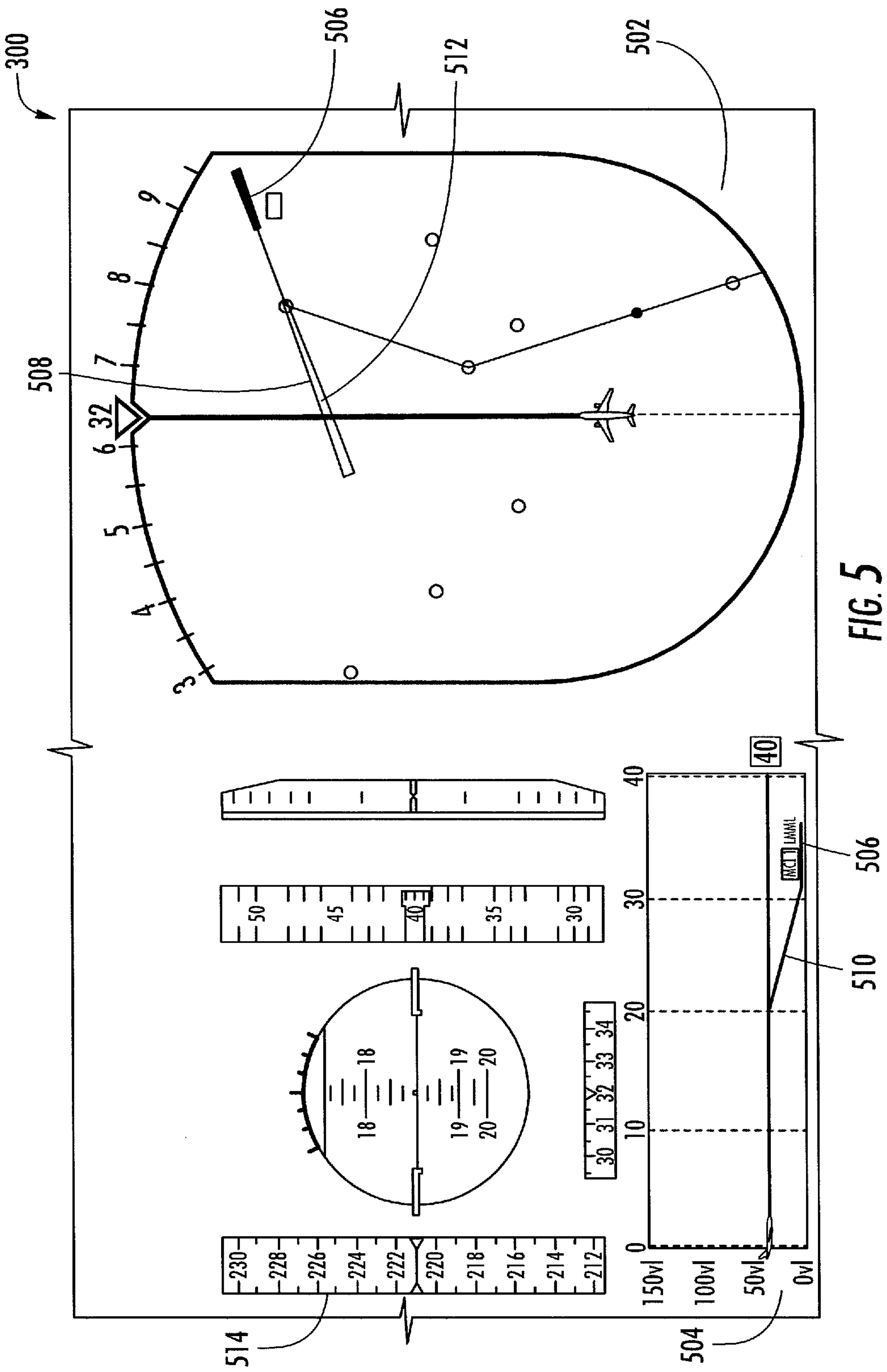
FIG. 5 is an exemplary illustration of a display unit showing a final approach runway and an approach path in accordance with aspects of the subject matter described herein.

FIG. 5 depicts an exemplary illustration of a display unit generally designated 300 showing a final approach runway and an approach path in accordance with embodiments of the subject matter described herein. As shown in FIG. 5, the display unit 300 can comprise a navigation display (ND) 502, a vertical display (VD) 504, and a primary flight display (PFD) 514. In one aspect, the final approach runway 506 can be shown on the ND 502 as a solid rectangular block, also shown on the ND 502 is the approach path 508 associated with the final approach runway 506. Furthermore, the approach path 508 can comprise a vertical axis 510 and a lateral axis 512, which also are a part of an instrument landing system associated with the final approach runway 506. The vertical axis 510 of the approach path can be shown on the VD 504. For example, the vertical axis 510 can plot a vertical trajectory for the aircraft, connecting the aircraft to the final approach runway 506 from the aircraft's current altitude.

Figure 6:
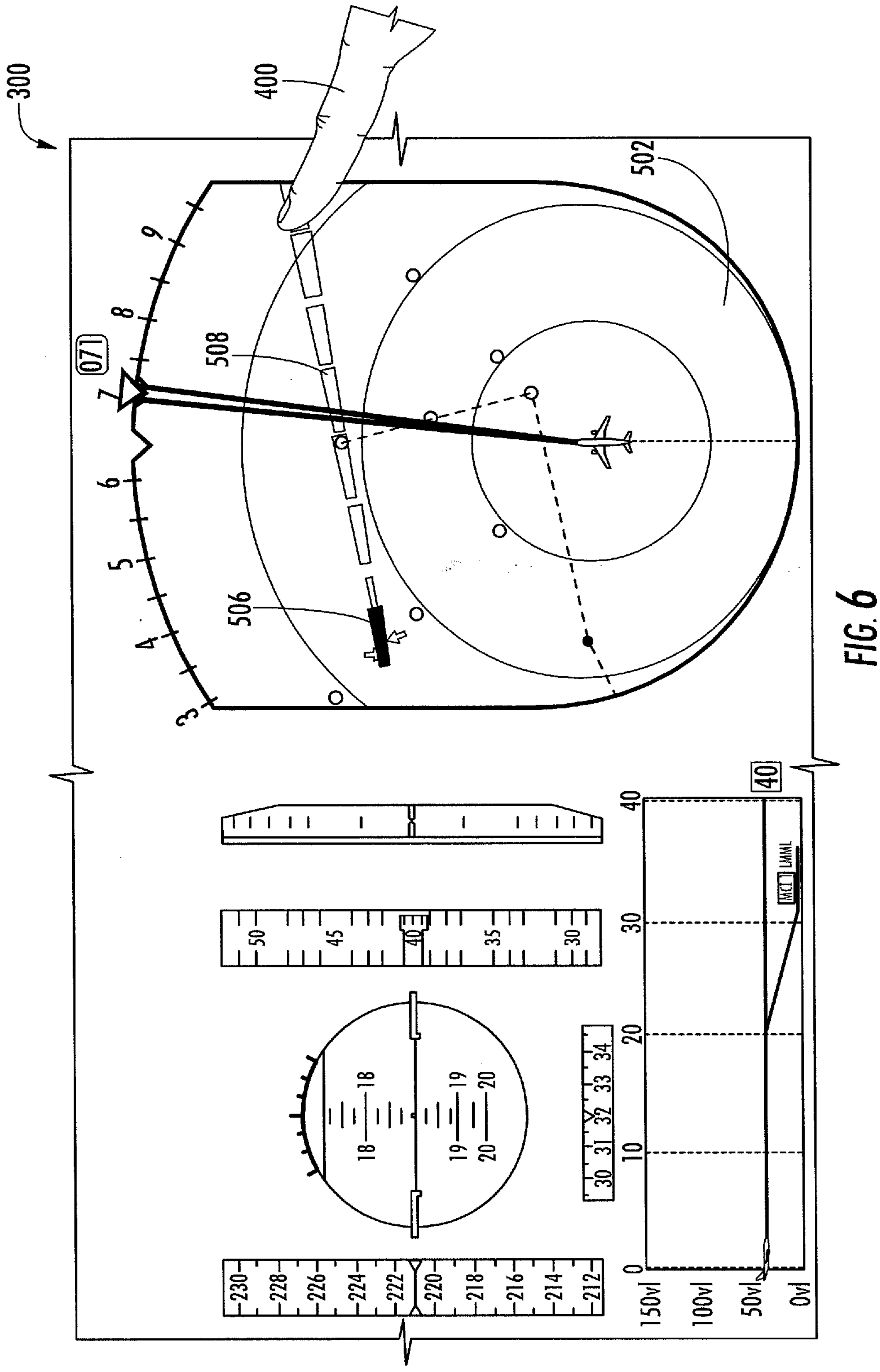
FIG. 6 is an exemplary illustration of the aircraft operator arming the final approach runway on the display unit in accordance with aspects of the subject matter described herein.

The aircraft operator 400 can select the final approach runway 506 on the display unit 500 in accordance with embodiments of the subject matter described herein. Specifically, as shown in FIG. 6, the navigation display (ND) 502 can comprise an interactive touch screen. In this arrangement, the aircraft operator 400 can select the final approach runway 506 such as by physically touching the ND 502. For example, the aircraft operator 400 can select the final approach runway 506 by either physically touching the final approach runway 506 or the approach path 508 on the interactive touch screen.

Figure 7:
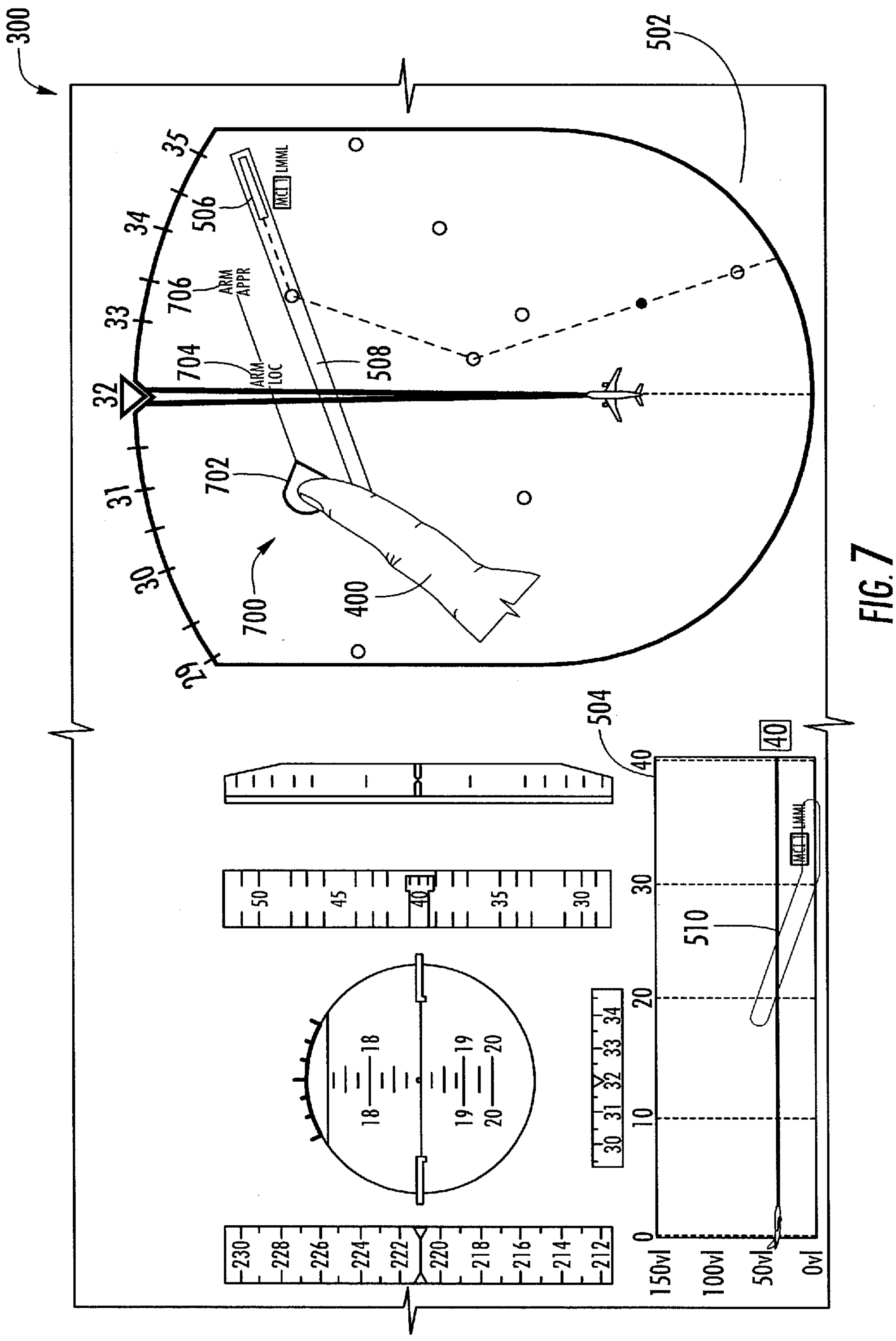
FIG. 7 is an exemplary illustration of the display unit showing an interactor and at least one symbol associated with a runway approach guidance mode in accordance with aspects of the subject matter described herein.

As shown in FIG. 7, once the final approach runway 506 is selected, an interactor 700 and at least one symbol associated with a runway approach guidance mode can be displayed in accordance with embodiments of the subject matter described herein. In one aspect, when the aircraft operator 400 touches the interactor 700 on the interactive touch screen, a first symbol associated with the lateral runway approach guidance mode and a second symbol associated with the vertical runway approach guidance mode can appear on the interactive touch screen. For example, an 'ARM LOC' setpoint position 704 can be displayed on the ND 502 representing a position to which the interactor 700 can be moved to arm the lateral runway approach guidance mode, and an 'ARM APPR' setpoint position 706 can be appear on ND 704 representing a position to which the interactor 700 can be moved to arm both the vertical and lateral runway approach guidance modes.

Furthermore, also shown in FIG. 7 are the final approach runway 506 and associated approach path 508 after they have been selected by the aircraft operator 400. After the final approach runway 506 has been selected by the aircraft operator 400, the final approach runway 506 and associated approach path 508 can appear highlighted on the ND 502. For example, the final approach runway 506 and associated approach path 508 can appear blue in color. Similarly, the vertical axis 510 of the approach path 508 on the VD 504 can also be blue in color and appear highlighted.

Figure 8:
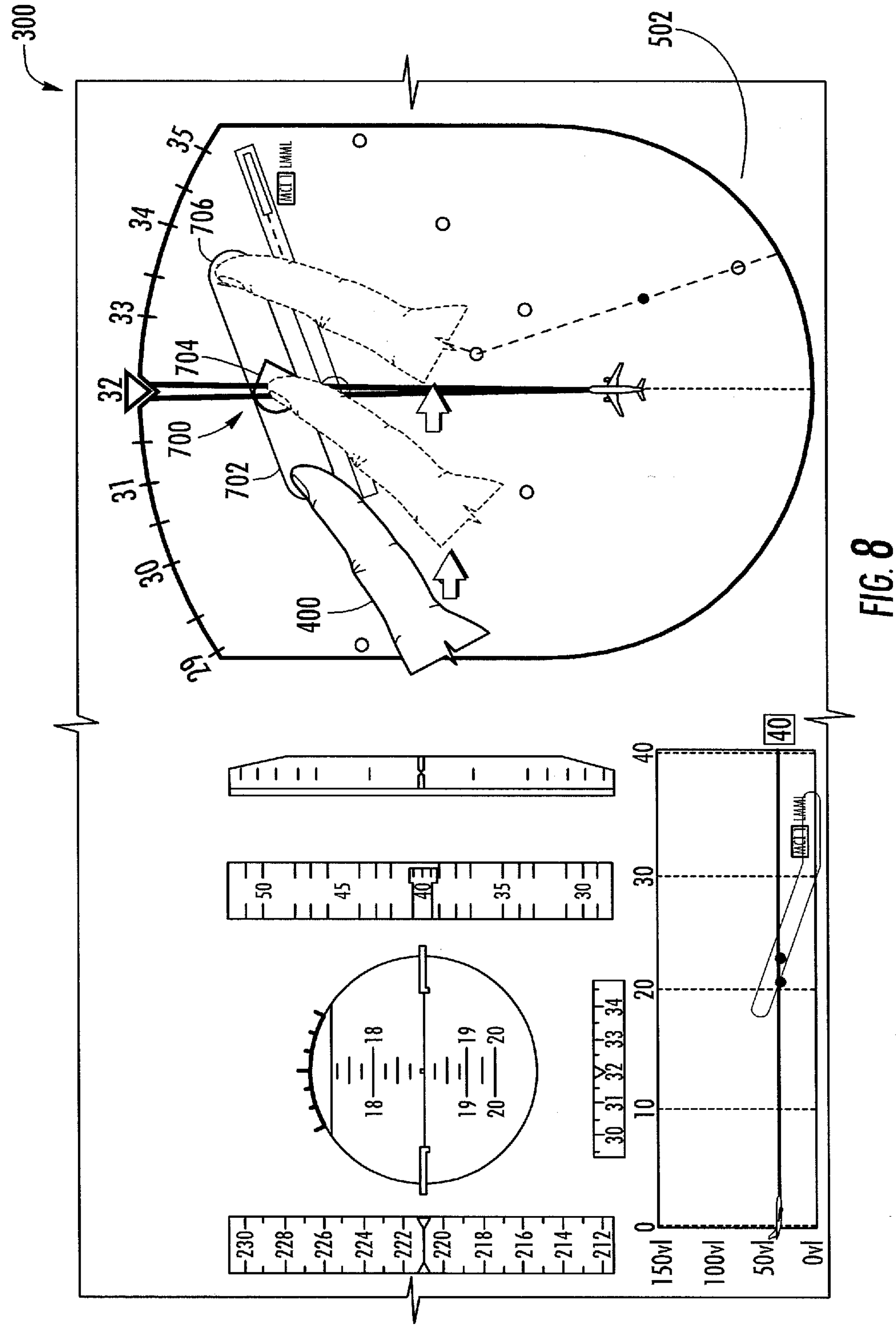
FIG. 8 is an exemplary illustration of the aircraft operator directly arming runway approach guidance modes on the display unit in accordance with aspects of the subject matter described herein.

Referring to FIG. 8, the aircraft operator can directly arm runway approach guidance modes on the display unit in accordance with embodiments of the subject matter described herein. Specifically, the aircraft's runway approach guidance modes can be armed via, for example, the aircraft operator sliding the interactor 700 across respective symbols associated with the lateral and vertical runway approach guidance modes. For example, to arm the lateral runway approach guidance mode only, the aircraft operator can slide the interactor 700 from a starting position 702 to the ARM LOC setpoint position 704. Similarly, to arm both the lateral and vertical runway approach guidance modes, the aircraft operator can slide the interactor 700 from the starting position 702 across both the ARM LOC and ARM APPR setpoint positions 704 and 706.

Figure 9:
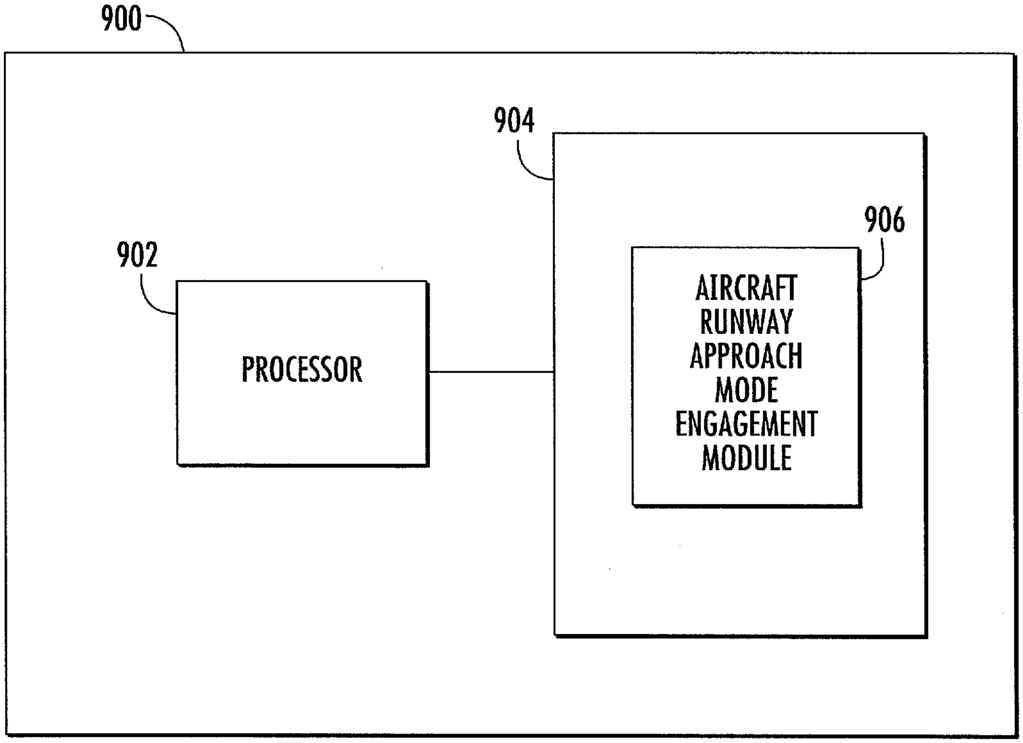
FIG. 9 is a block diagram illustrating an exemplary system for direct arming of runway approach guidance modes of an aircraft in accordance with aspects of the subject matter described herein.

FIG. 9 is a block diagram illustrating an exemplary system for direct arming of runway approach guidance modes of an aircraft in accordance with embodiments of the subject matter described herein. Referring to FIG. 9, a system generally designated 900 can comprise a hardware-based processor 902 and a memory unit 904. Memory unit 904 can contain one or more software-based or firmware-based modules for execution by processor 902. For example, memory unit 904 can contain an aircraft runway approach mode engagement module 906, which can be configured to select an airport from a flight management system database, display on a display unit a list of available active runways, select an active runway for final approach, display the selected final approach runway and an approach path associated with the runway, select the final approach runway, display an interactor associated with the final approach runway on the display unit, display on a display unit at least one symbol associated with at least one runway approach guidance mode, and arm at least one runway approach guidance mode.

In some aspects, the aircraft approach mode engagement module 906 can be in communication with an aircraft guidance system and can be configured to direct the aircraft guidance system to arm a lateral runway approach guidance mode and a vertical runway approach guidance mode. For example, arming the lateral runway approach guidance mode can direct the aircraft guidance system to align the aircraft to a localizer axis of an instrument landing system beam axis associated with the final approach runway. Furthermore, arming the vertical runway approach guidance mode can direct the aircraft guidance system to adjust the aircraft's altitude to a glide slope altitude of an instrument landing system beam axis associated with the final approach runway.

In another aspect, the display unit can comprise a navigation display with an interactive touch screen. In addition, the aircraft runway approach mode engagement module can be configured to recognize the movement of the interactor via an aircraft operator touching the interactor on the display unit and sliding it across the symbols associated with the vertical and lateral runway approach guidance mode.

In yet another aspect, the aircraft runway approach mode engagement module 906 can be in communication with an aircraft guidance system and can be configured to direct the aircraft guidance system to arm only a lateral runway approach guidance mode. For example, air traffic around the airport may be congested, an air traffic controller can direct the aircraft to fly around the airport keeping a constant altitude. The aircraft runway approach mode engagement module can be configured to arm the lateral runway approach guidance mode by recognizing the movement of the interactor, via a physical gesture, across the symbol associated with the lateral runway approach guidance mode.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for direct arming at least one runway approach guidance mode of an aircraft, the method comprising:

using an aircraft runway approach mode engagement module implemented using a processor for:

displaying, on a display unit, a navigation display comprising an active runway for final approach that is connectedly aligned with a lateral axis of an approach path associated with the active runway, and a vertical display comprising the active runway for final approach that is connectedly aligned with a vertical axis of the approach path associated with the active runway;

selecting the active runway for final approach;

displaying on the display unit an interactor associated with the selected final approach runway;

displaying on the display unit at least one symbol associated with the at least one runway approach guidance mode;

moving the interactor to select the at least one symbol associated with the at least one runway approach guidance mode; and arming, on the navigation display of the display unit, a lateral runway approach guidance mode that provides lateral approach guidance and a vertical runway approach guidance mode that provides vertical approach guidance.

2. The method of claim 1, further comprising selecting an airport from a flight management system database.

3. The method of claim 1, wherein arming the lateral runway approach guidance mode comprises aligning the aircraft to a localizer axis of an instrument landing system beam axis associated with the selected final approach runway.

4. The method of claim 1, wherein arming the vertical runway approach guidance mode comprises adjusting an altitude of the aircraft to a glide slope altitude of an instrument landing system beam axis associated with the selected final approach runway.

5. The method of claim 1, wherein displaying the at least one symbol associated with the at least one runway approach guidance mode on the display unit comprises displaying at least one of a first symbol for the lateral runway approach guidance mode and a second symbol for the vertical runway approach guidance mode.

6. The method of claim 5, wherein arming one or both of the lateral runway approach guidance mode and the vertical runway approach guidance mode comprises moving the interactor, via a physical gesture, across at least one of the first symbol for the lateral runway approach guidance mode and the second symbol for the vertical runway approach guidance mode.

7. The method of claim 6, wherein moving the interactor via the physical gesture comprises touching the interactor on the display unit and sliding the interactor across at least one of the first symbol for the lateral runway approach guidance mode and the second symbol for the vertical runway approach guidance mode.

8. The method of claim 1, wherein selecting the active runway is achieved by performing a physical gesture.

9. The method of claim 8, wherein performing the physical gesture comprises touching the active runway on the display unit.

10. The method of claim 8, wherein performing the physical gesture comprises touching the approach path associated with the active runway.

11. A system for direct arming of a runway approach guidance mode of an aircraft, comprising:

a display unit comprising a navigation display and a vertical display; and a processor configured to execute an aircraft runway approach mode engagement module;

wherein the aircraft runway approach mode engagement module is configured to display, on the navigation display, an active runway associated with a selected airport for final approach that is connectedly aligned with a lateral axis of an approach path associated with the active runway, display, on the vertical display, the active runway for final approach that is connectedly aligned with a vertical axis of the approach path associated with the active runway, select the active runway for final approach, display on the display unit an interactor associated with the selected final approach runway, display on the display unit at least one symbol associated with the at least one runway approach guidance mode, and arm the at least one runway approach guidance mode by arming, on the navigation display of the display unit, a lateral runway approach guidance mode that provides lateral approach guidance and a vertical runway approach guidance mode that provides vertical approach guidance.

12. The system of claim 11, wherein the aircraft runway approach mode engagement module is further configured to select an airport from a flight management system.

13. The system of claim 11, wherein the aircraft runway approach mode engagement module is in communication with an aircraft guidance system; and wherein the aircraft approach mode engagement module is configured to direct the aircraft guidance system to arm the lateral runway approach guidance mode and the vertical runway approach guidance mode.

14. The system of claim 13, wherein the aircraft runway approach mode engagement module is configured to direct the aircraft guidance system to align the aircraft to a localizer axis of an instrument landing system beam axis associated with the final approach runway.

15. The system of claim 13, wherein the aircraft runway approach mode engagement module is configured to direct the aircraft guidance system to adjust an altitude of the aircraft to a glide slope altitude of an instrument landing system beam axis associated with the final approach runway.

16. The system of claim 13, wherein the aircraft runway approach mode engagement module is configured to display at least one of a first symbol for the lateral runway approach guidance mode and a second symbol for the vertical runway approach guidance mode.

17. The system of claim 16, wherein the aircraft runway approach mode engagement module is configured to arm one or both of the lateral runway approach guidance mode and the vertical runway approach guidance mode by recognizing movement of the interactor across at least one of the first symbol for the lateral runway approach guidance mode and the second symbol for the vertical runway approach guidance mode.

18. The system of claim 17, wherein the display unit comprises an interactive touchscreen display; and wherein the aircraft runway approach mode engagement module is configured to recognize the movement of the interactor via an aircraft operator touching the interactor on the display unit and sliding it across at least one of the first symbol for the lateral runway approach guidance mode and the second symbol for the vertical runway approach guidance mode.

19. The system of claim 11, wherein the aircraft runway approach mode engagement module is configured to select the final approach runway by recognizing a physical gesture performed by an aircraft operator.

20. The system of claim 19, wherein the aircraft runway approach mode engagement module is configured to recognize the physical gesture by recognizing a touch of the final approach runway on the display unit.

21. The system of claim 20, wherein the aircraft runway approach mode engagement module is configured to recognize the physical gesture by recognizing the touch of the approach path associated with the selected airport.

22. A non-transitory computer readable medium having stored thereon executable instructions that when executed by a processor of a computer control the computer to perform steps comprising:

displaying, on a display unit, a navigation display comprising an active runway for final approach that is connectedly aligned with a lateral axis of an approach path associated with the active runway, and a vertical display comprising the active runway for final approach that is connectedly aligned with a vertical axis of the approach path associated with the active runway;

selecting the active runway for final approach;

displaying on the display unit an interactor associated with the selected final approach runway;

displaying on the display unit at least one symbol associated with the at least one runway approach guidance mode; and arming the at least one runway approach guidance mode;

wherein arming the at least one runway approach guidance mode comprises arming, on the navigation display of the display unit, a lateral runway approach guidance mode that provides lateral approach guidance and a vertical runway approach guidance mode that provides vertical approach guidance.

23. The computer readable medium of claim 22, further comprising selecting an airport from a flight management system database.

* * * * *